Feb. 21, 1950      A. A. GASSNER      2,497,880
RETRACTABLE LANDING GEAR

Filed Aug. 23, 1948      5 Sheets-Sheet 1

INVENTOR
ALFRED A. GASSNER
BY
his ATTORNEYS.

Feb. 21, 1950

A. A. GASSNER 2,497,880

RETRACTABLE LANDING GEAR

Filed Aug. 23, 1948

INVENTOR
ALFRED A. GASSNER
BY
*his* ATTORNEYS

Patented Feb. 21, 1950

2,497,880

UNITED STATES PATENT OFFICE 2,497,880

RETRACTABLE LANDING GEAR

Alfred A. Gassner, New York, N. Y., assignor to Fairchild Engine and Airplane Corporation, a corporation of Maryland Application August 23, 1948, Serial No. 45,597

20 Claims. (Cl. 244—102)

This invention relates to retractable landing gear for aircraft and has particular reference to an endless track type of landing gear which is foldable for compact stowage after retraction, although the invention is not limited to that use.

It is generally recognized that endless track type landing gear has the advantage over the wheel type landing gear in that it enables the aircraft to land on, taxi over, and take off from soft or uneven terrain provided the bearing surface of the track or track print area is sufficiently large to keep the ground pressure on the gear down to a value of about 25 to about 28 pounds per square inch static loading. As the overall weight of the aircraft is increased, the track print area increases accordingly until for large and heavy craft such as cargo aircraft, the gear must be inordinately large in order to provide track print areas of a size to keep the ground pressure down to the afore-mentioned 25 to 28 pounds per square inch static loading. Inasmuch as the width of the stowing nacelle width limits the track width, it becomes necessary to increase the track length in order to maintain the required track print area. But when the track length is thus increased, retraction of the gear becomes practically impossible since the nacelle space of existing aircraft is too short to accommodate a long track, thus requiring aircraft redesign, which is usually not feasible since standard models are desired and should be adaptable without material change for use on landing fields with usual tricycle landing equipment, as well as for special uses as here described, merely by fitting them with the proper landing gear for the required service.

In accordance with the present invention, an endless track type landing gear for even the largest known aircraft is provided, which is retractable into the stowage space of the aircraft and which affords the desirably low ground pressure of about 25 to 28 pounds per square inch in order to have the advantages of smaller, track-equipped aircraft, of maneuverability over, landing on and take-off from soft and irregular terrain. These desirable attributes are largely provided by the foldability of the gear before retraction into a compact size and shape, enabling it to be retracted into the nacelle space of existing aircraft for stowage during flight, without impairing its facility of rapid and secure extension prior to landing to serve as the landing gear for the aircraft.

In a preferred embodiment of the invention, the endless track passes over front, intermediate and rear bogies or wheels in a known manner and the frame of the gear is mounted on a horizontal transverse shaft carried by the air frame, about which the entire gear may pivot in a vertical plane, means also being provided for a limited oscillation about a fore-and-aft axis to accommodate obstructions and uneven ground during taxing, take-off and landing. The frame of the gear is divided, the front part of the frame carrying the front wheel or bogie assembly being pivotable upwardly about a transverse axis by a hydraulically-actuated linkage to cause the front wheels or bogies to move bodily rearwardly and upwardly, thereby carrying the track with them to be folded upon itself about an idler engaging the upper surface of the upper course of the track so that the gear assumes a generally C-shaped configuration, with the result that the overall length of the track is materially decreased from its normal extended position, thus enabling it to be stowed into a much smaller space. At the same time the gear is rotated to a generally vertical position, from which suitable retracting mechanism further raises the gear into an inverted position and simultaneously introduces it into the stowage space of the nacelle wherein it reposes during flight.

It will be seen that by means of the foldable and retractable landing gear of this invention, large and heavy aircraft are enabled to land upon and take off from unprepared and uneven terrain with substantially the facility of landing upon and taking off from a landing field, while at the same time material redesign of existing aircraft becomes unnecessary in order to accommodate landing gear having sufficiently low ground pressure per square inch of track print surface to permit operations to, over and from the afore-mentioned unprepared and uneven or soft terrain.

For a more complete understanding of the invention, reference may be had to the accompanying drawings in which.

Figure 1:
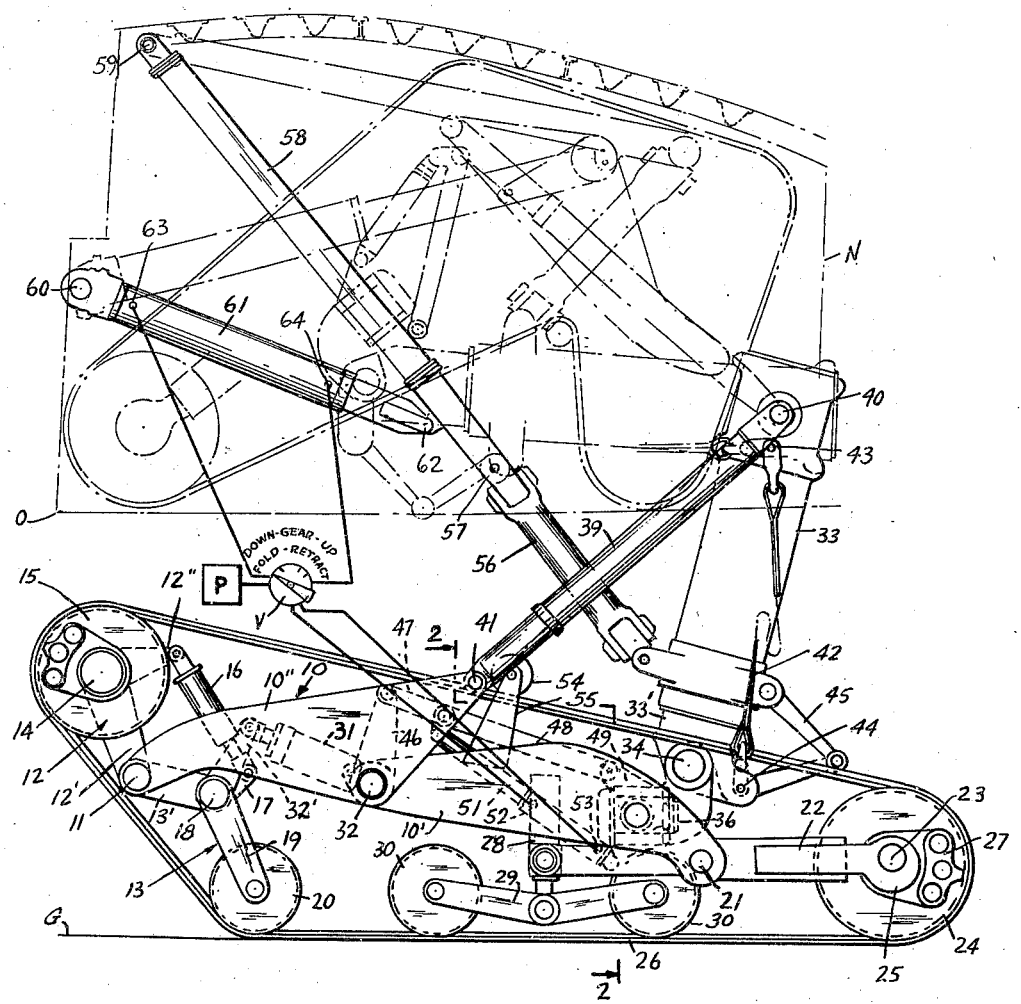
Figure 1 illustrates the foldable retracting gear of this invention shown both in the full ground contact position for static and taxiing purposes, and in dotted lines in the retracted and folded position within the stowage nacelle.

Referring particularly to Fig. 1, there is shown by way of illustration and not limitation, the endless track landing gear for aircraft disclosed in copending application Serial No. 37,628, filed July 8, 1948, by Jacobson, Brader and Fleck, although it is to be understood that the invention is equally applicable to endless track gear of other constructions. In the ensuing description, the near side of the gear will be described, it being understood that the other or far side is the same.

The frame 10 carries at its forward end, the horizontal shaft 11 about which are pivoted two bell cranks 12 and 13, both at the free ends of one of their arms 12' and 13', respectively. Bell crank 12 carries at its elbow the horizontal shaft 14 for the front idler wheel or bogie 15 which is fully elevated above the ground surface G when the gear is in fully extended position. The free end of the other arm 12'' of bell crank 12 is pivoted to the cylinder of a shock absorber 16 whose piston is connected to a lever 17 in turn connected to the elbow 18 of the bell crank 13, the free end of whose other lever 19 carries the front wheel or bogie 20.

Pivoted intermediate its ends on cross-shaft 21 at the rear of the frame 10 is a substantially horizontal lever 22 carrying at its rear free end the rear axle 23 upon which the rear wheel or bogie 24 is journaled through the intermediary of an eccentric 25 whereby the track 26 encircling wheels or bogies 15, 20 and 24 is automatically tightened to tension the track upon application of the brake 27, as is described in greater detail in said copending application. The forward end of the rear horizontal lever 22 is pivoted to the cylinder of a vertical shock strut 28 whose piston is pivoted to the approximate center of a substantially horizontal lever 29 at whose opposite free ends are journaled the two intermediate ground engaging wheels or bogies 30. A third shock strut 31 is connected between a fixed point 32 on the frame 10 and a lever 32' connected to the elbow of bell crank lever 13, as shown.

The foregoing describes the essentials of the endless track gear disclosed in the afore-mentioned application which is illustrated herein as a known landing gear to which the present invention may be applied. Instead of forming the bolsters of frame 10 of one piece, in the form of a steel casting, for example, they are made in two parts at each side of the gear, so that the rear part 10' of the frame 10 remains relatively stationary and carries rear wheel or bogie 24 and intermediate wheels or bogies 30 in a relatively fixed position, whereas the front portion 10'' of the frame constitutes essentially a cantilever extension of the rear portion 10' but is rotatable with cross-shaft 32 journaled in rear frame 10' so that front frame 10'' may move in an upward and rearward arc to swing the front bell cranks 12 and 13 upward and rearward and with the corresponding idler wheel or bogie 15 and forward wheel or bogie 20 in the manner shown particularly in Fig. 4. Also movable upwardly and rearwardly with bell cranks 12 and 13 are the shock struts 16, 31 as is further shown particularly in Fig. 4.

Figure 2:
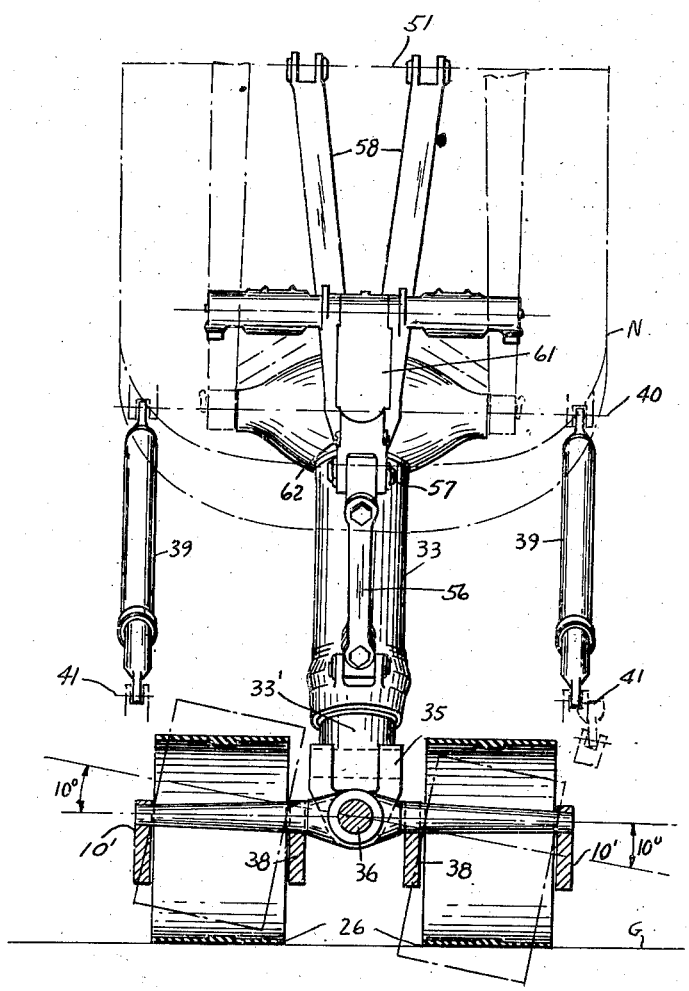
Fig. 2 is a front view of the gear in extended position as seen in partial sectional view along the line 2—2 of Fig. 1.

Pivoted about a horizontal transverse axis 40 on the air frame is the main load-carrying strut 33, in the form of a shock absorber whose piston 33' is connected at its free end by the horizontal transverse pivot pin 34 to an L-shaped clevis 35 terminating in a short horizontal fore-and-aft shaft 36, shown particularly in Fig. 2. Journaled on fore-and-aft shaft 36 is the horizontal bar 37 on whose opposite free ends are mounted the bolsters largely constituting the rear frame 10' and including the intermediate bolsters 38 so that the entire frame 10 composed of the relatively stationary rear portion 10' and the pivoted forward portion 10'' may tilt laterally to an extent limited by auxiliary struts 39 extending between the forward portion 10'' of the frame and a pivot point 40 on the air frame aligned with the pivot point 40 of main strut 33 and to be described in greater detail. The bodily rotation of the frame 10 and consequently of the landing gear itself about horizontal fore-and-aft axis 36 is limited in this fashion to approximately 10° at either side of horizontal, as is indicated in dotted lines in Fig. 2, and is sufficient to enable the gear to accommodate obstructions, uneven ground and other irregularities during taxiing, take-off and landing.

The afore-mentioned auxiliary shock struts 39 extending from pivot points 40 on the nacelle N of the aircraft to pivot points 41 on the rear upper corner of the forward frame portion 10'' aid main strut 33 in transmitting the weight of the airplane to the track gear under normal landing, taxiing and static conditions of the craft. When the airplane is in the air, struts 33 and 39 extend to the limit of their length and the track gear assumes substantially the position shown in Fig. 3.

An inelastic cable 42 extends between point 43 near the upper end of the shock strut 33 to a point 44 on the piston 33' so as to relieve the piston 33' of the weight of the gear when in extended position in the air, to limit the degree of extension of shock strut 33, and also slightly retract the piston 33' in a manner to be described. A linkage 45 extends between pivot point 44 on piston 33' of main shock strut 33 and the lower end of the cylinder of shock strut 33 to maintain the track oriented parallel to the fore-and-aft axis of the aircraft.

Figure 3:
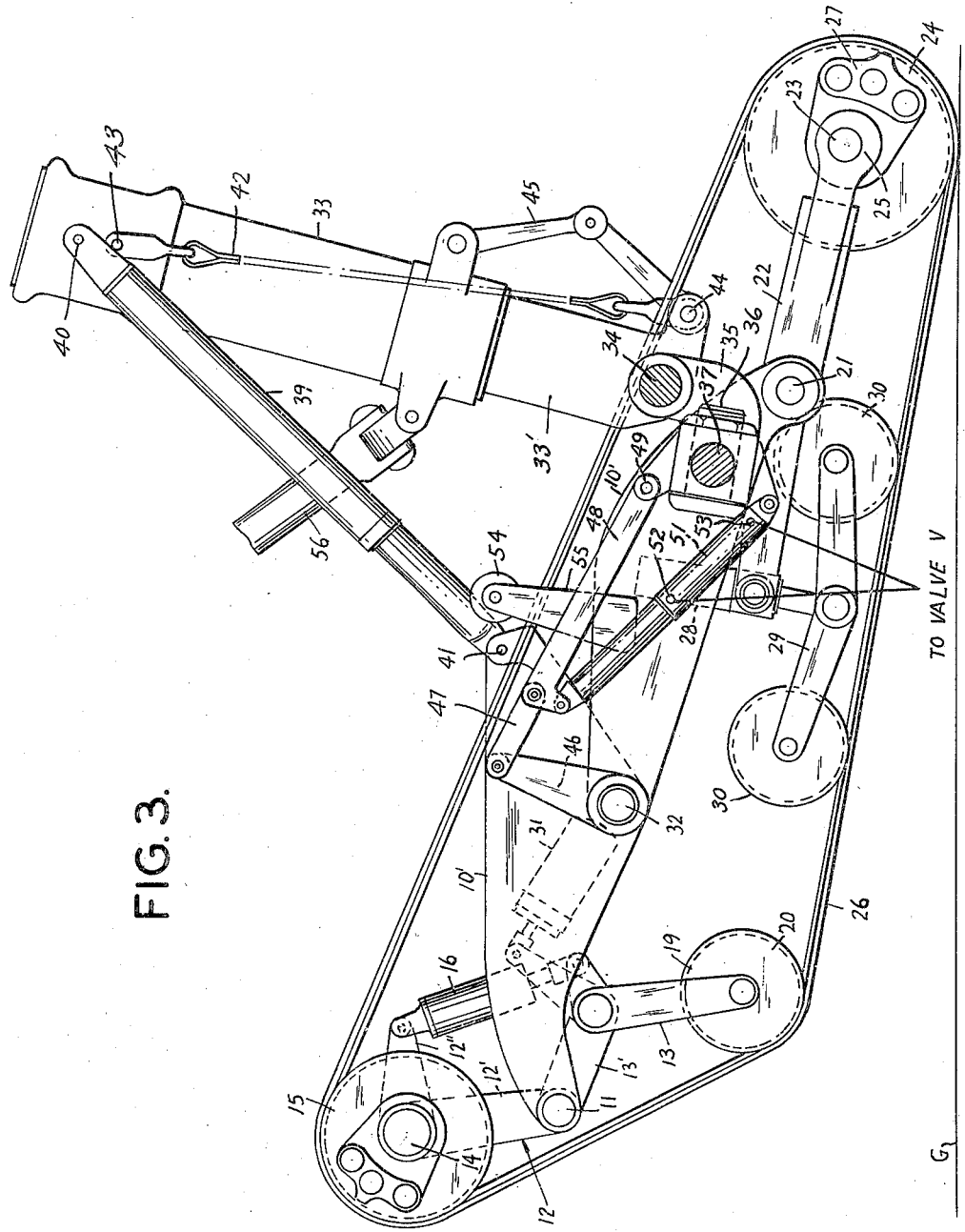
Fig. 3 is an elevation of the gear shown in extended position as it engages and leaves the ground.
Figure 4:
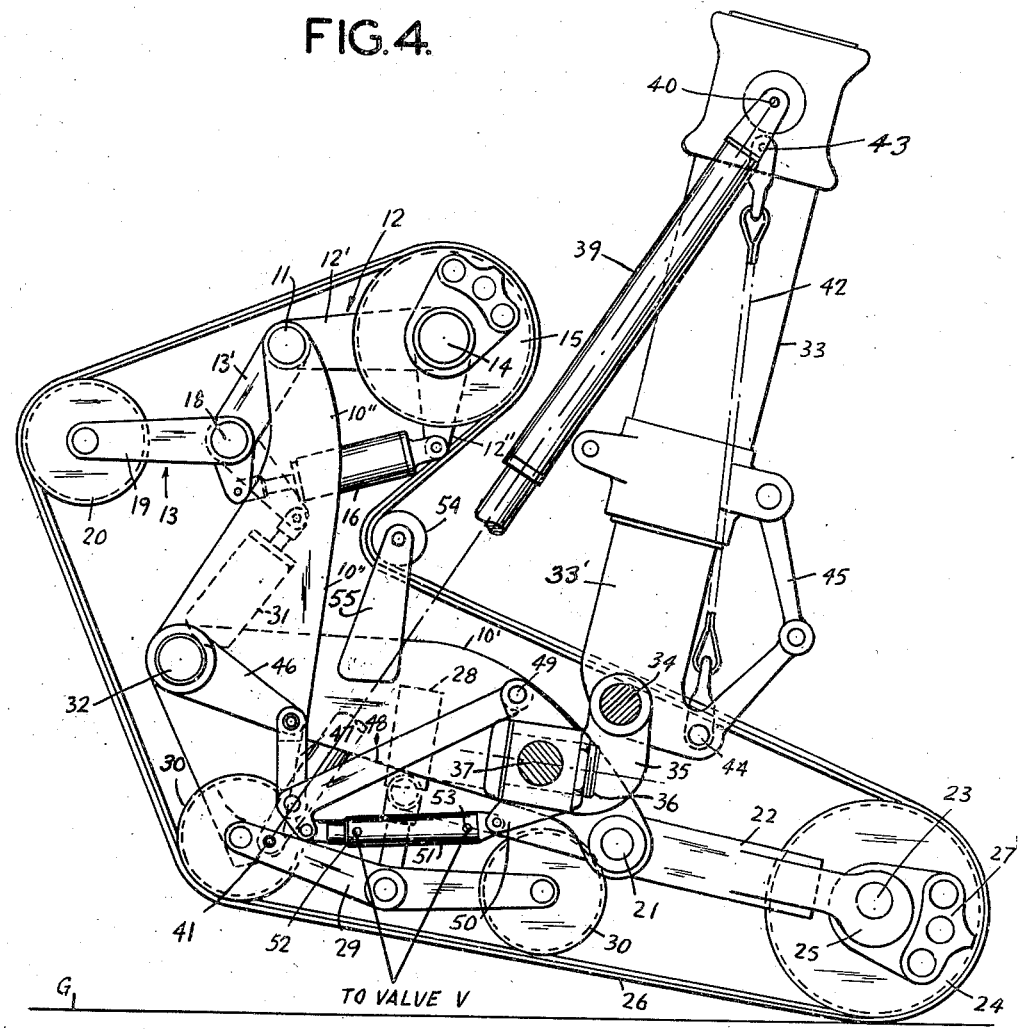
Fig. 4 shows the gear in folded position.

Secured to shaft 32 carrying forward frame portion 10'' is the normally upwardly extending lever 46 shown especialy in Figs. 1 and 4. The free end of lever 46 is connected by link 47 to the forward end of a normally horizontal arm 48 pivoted at its rear end to a bracket 49 integral with the clevis 35, as shown especially in Fig. 3. By means of link 47 and arm 48, the lever 46 is braced so as to prevent shaft 32 and forward frame portion 10'' from rotating, except when actuated to do so.

The forward end of arm 48 is also connected to an extension 50 of clevis 35 by a hydraulically-operated actuating strut 51 provided with hydraulic actuating fluid inlet and outlet ports 52 and 53, connected through a suitable two-position manual valve control V to a source of hydraulic pressure P, of conventional construction. When valve V is moved to "Fold" position, pressure fluid is introduced through it from tank P to port 52 and relieved at port 53, so that the piston in strut 51 retracts to cause strut 51 to shorten, whereas introduction of the pressure fluid at port 53 and relief at port 52 will cause the actuating strut 51 to lengthen, with a result to be described.

Extending transversely across, but spaced slightly above the upper surface of the upper course of track 26 is a roller 54 journaled on brackets 55 secured to the corresponding rear frame 10' at opposite sides of the gear.

The lower portion of the nacelle N is open at O, and within it is located the retracting mechanism for the gear, which is additional to and, to a certain extent, independent of the track folding mechanism just described. It includes a link 56 connecting the lower end of the shock strut 33 to a cross-pin 57, to which are connected the lower ends of a pair of links 58 pivoted at their upper ends 59 to a frame of the aircraft within the nacelle N. Also pivoted at point 60 on the aircraft frame within the nacelle N is the main retraction actuating strut 61 connected at its lower end 62 to the links 58 and having two alternative pressure fluid inlets and outlets 63 and 64 controlled by the valve V, arranged with its "Retract" position following the "Fold" position, in a clockwise direction, as indicated in Fig. 1.

In operation of the landing gear of this invention, and considering the folding operation, immediately after take-off of the aircraft, the operator moves valve V to "Fold" position, which effects the admission of pressure fluid to the inlet port 52 of the folding actuating strut 51, thereby causing it to shorten from the extended length shown in Fig. 3 to the shortened length shown in Fig. 4. The shortening of the actuating strut 51 pulls arm 48 downwardly about its pivot point 49, and with it, lever 46 is rotated clockwise through the intermediary of the link 47 connecting arm 48 to lever 46. Inasmuch as lever 46 is rigidly fastened on shaft 32, journaled in the front end of rear frame portion 10', and as the forward frame portion 10'' is rigidly secured to shaft 32, it is rotated upwardly and rearwardly by lever 46 about the axis of shaft 32 from the position shown in Fig. 3 to the position in Fig. 4. Inasmuch as the forward frame portion 10'' carries the bell cranks 12 and 13 on which front wheel 20 and front idler wheel 15 are mounted, these wheels 15 and 20 also move upwardly and rearwardly with forward frame portion 10'' carrying the corresponding part of the track 26 with them. By reason of the roller 54 extending across the upper surface of the upper course of the track 26, the track is folded about roller 54 in the manner shown in Fig. 4.

Figure 5:
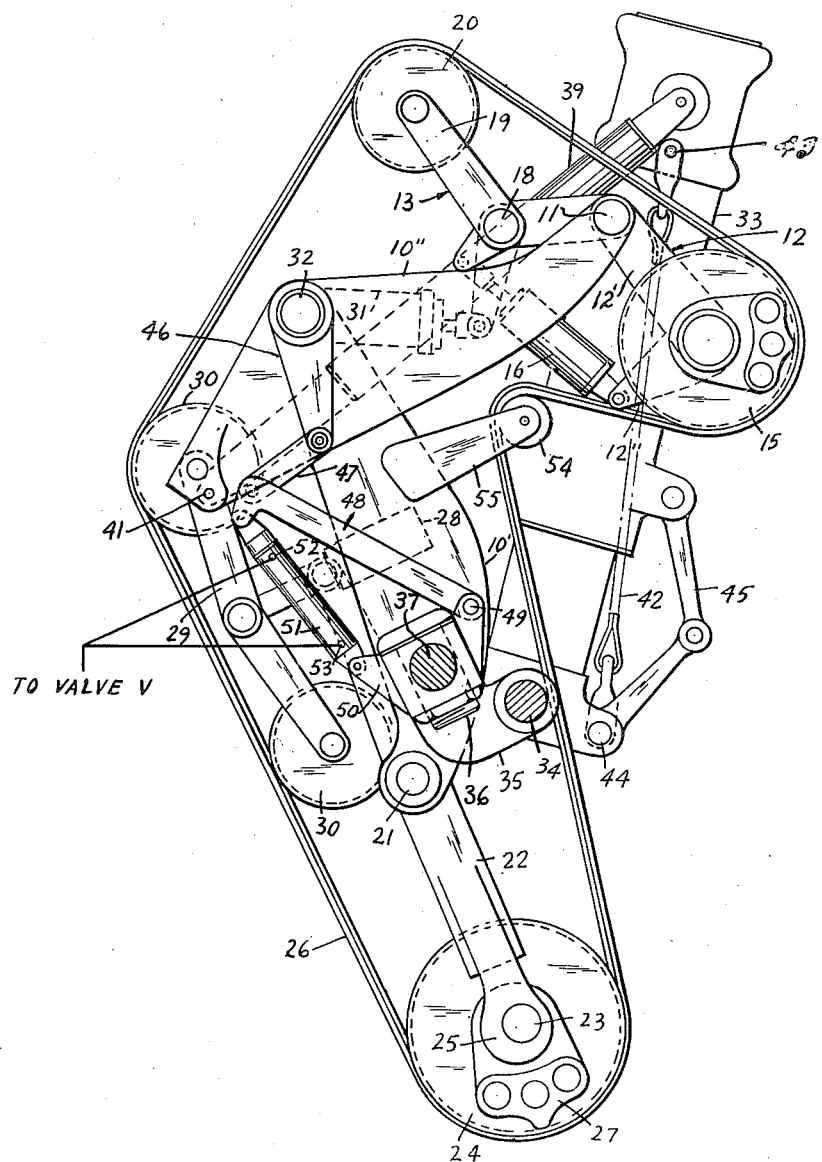
Fig. 5 illustrates the gear in a folded and rotated position ready for retraction.

Inasmuch as pivot 41 to which the lower ends of struts 39 are connected also rotates with frame extension 10'' when it turns about the axis of shaft 32 in the manner described, struts 39 being attached at their lower ends to pivots 41 and since they are at the limit of their length, the rotation of pivot 41 causes the entire gear to rotate about pivot point 34 at the same time the folding action previously described is taking place, with the result that the whole track assembly is rotated about horizontal shaft 34 from the position shown in Fig. 4 to the position shown in Fig. 5. Actually, there is no position corresponding exactly to Fig. 4, since struts 39 do not extend that far and hence are shown broken, but Fig. 4 clarifies the folding operation.

Following the folding and rotation of the entire track assembly to the position shown in Fig. 5, as described, the valve V is moved to "Retract," thereby placing the retraction actuating strut 61 into operation. Pressure fluid flows into port 63, whereby strut 61 is extended to fold links 58 about their pivot points 59 and draw link 56 upwardly with them. At the same time, the main load strut 33 swings forwardly and upwardly about its pivot point 40 so as to raise the entire gear from the Fig. 5 position and simultaneously invert the same into the nacelle N in the manner indicated in dotted lines in Fig. 1. It will be understood the gear is locked in folded, unfolded, retracted and extended positions by the hydraulic fluid pressure in actuating cylinders 51 and 61 as controlled by valve V.

Before the gear is introduced into the nacelle N, which is accompanied by forward and upward rotation of main load strut 33 about its pivot 40 as described, it is necessary in one case to further shorten the length of the main load strut 33 by a small amount, say three inches, so that the folded and rotated track gear will fit into the nacelle compartment of a present model of aircraft. This shortening of main load strut 33 is effected by the cable 42 and to that end the point 44 of attachment of the lower end of cable 42 is positioned rearwardly of the axis of the strut 33 so that a toggle effect is produced, whereby the cable draws the piston 33' upwardly into the cylinder of the main strut 33 by say, three inches, as the strut 33 is rotated to full retracted position. This added function of cable 42, accordingly, effects a further contraction of the landing gear and enables use of sufficiently large landing gear on standard craft to accommodate even unusually heavy loads or afford service to, over and from exceptionally soft terrain, for example. Also larger gear may be used in smaller stowage spaces than is possible without the additional contraction afforded by cable 42, in the manner described.

In extending the gear from the stowed position shown in dotted lines in Fig. 1, to the landing position shown in Fig. 3, the afore-mentioned pressure control valve V will be operated in reverse sequence, first to "Retract" position to supply the main retracting strut 61 at port 64 with pressure fluid to shorten the same and lower the gear to the folded position shown in Fig. 5. Then the valve V is moved to "Fold" position so that the pressure fluid is supplied to folding actuating strut 51 to extend the same from the length shown in Fig. 5 to that shown in Fig. 3 to effect the unfolding of the gear from the folded shape shown in Fig. 5 to the fully extended shape shown in Fig. 3. It will be understood that the operation of the several parts is effected in the reverse order from that previously described in connection with folding and rotating prior to retraction.

When the gear is extended to the position shown in Fig. 3, the aircraft is ready to land, the rear end or heel of the track 26 engaging the ground first by reason of the lower position of the rear bogie 24. As the rear of the track engages the ground, the main load strut 33 contracts on impact and the gear swings about horizontal pivot 34 in a counter-clockwise direction until the full track print engages the ground as shown in Fig. 1, the track meanwhile adjusting itself laterally in the manner indicated in Fig. 2 to accommodate lateral unevenness of the ground.

It will be understood that two or more of the landing gear illustrated and described will be used on each aircraft, or one of them with pilot wheels, and the like, depending upon requirements. Also, the nose gear may be made steerable in a suitable manner, such as is described in connection with the nose gear disclosed in the afore-mentioned copending application. The control mechanism, including valve V may be made automatically sequential in a known manner, requiring only one movement in each direction to effect both folding and retraction in sequence and vice versa.

Although a preferred embodiment of the folding endless track gear has been illustrated and described herein, it is understood that the invention is not limited thereby nor is this folding track limited to use on airplanes, but is susceptible of other uses and to changes in form and detail within the scope of the appended claims.

I claim:

1. In endless track gear of the type having a longitudinal frame, front and rear wheels carried thereby and an endless belt encircling said wheels, the combination of hinge means dividing said frame transversely into aligned front and rear portions, and motive means for swinging said frame portions relatively to each other about said hinge means to at least partially fold one frame portion, the corresponding wheel and the corresponding belt section upon the other frame portion and its appurtenant wheel and belt section.

2. In endless track gear of the type having a longitudinal frame, front and rear wheels carried thereby and an endless belt encircling said wheels, the combination of hinge means dividing said frame transversely into aligned front and rear portions, motive means for swinging said frame portions relatively to each other about said hinge means to at least partially fold one frame portion, the corresponding wheel and the corresponding belt section upon the other frame portion and its appurtenant wheel and belt section, and a member mounted on said other frame portion and extending across the outer surface of the belt at a point substantially opposite said hinge means about which said corresponding section of the belt is folded during the said swinging movement of said one frame portion.

3. In endless track gear of the type having a longitudinal frame, front and rear wheels carried thereby and an endless belt encircling said wheels, the combination of hinge means dividing said frame transversely into aligned front and rear portions, and motive means for swinging said frame portions relatively to each other about said hinge means to at least partially fold one frame portion, the corresponding wheel and the corresponding belt section upon the other frame portion and its appurtenant wheel and belt section, and reversing control means for causing said motive means to fold and unfold said gear.

4. In endless track gear of the type having a longitudinal frame, front and rear wheels carried thereby and an endless belt encircling said wheels, the combination of hinge means dividing said frame transversely into aligned front and rear portions, motive means for swinging said frame portions relatively to each other about said hinge means to at least partially fold one frame portion, the corresponding wheel and the corresponding belt section upon the other frame portion and its appurtenant wheel and belt section, a member mounted on said other frame portion and extending across the outer surface of the belt at a point substantially opposite said hinge means about which said corresponding section of the belt is folded during the said swinging movement of said one frame portion, and reversing control means for causing said motive means to fold and unfold said gear.

5. In endless track gear of the type having a longitudinal frame, front and rear wheels carried thereby and an endless belt encircling said wheels, the combination of hinge means dividing said frame transversely into aligned front and rear portions, and means for locking said front and rear frame portions in folded position about said hinge means.

6. In endless track gear of the type having a longitudinal frame, front and rear wheels carried thereby and an endless belt encircling said wheels, the combination of hinge means dividing said frame transversely into aligned front and rear portions, a member mounted on one of said frame portions and extending across the outer surface of the belt at a point substantially opposite said hinge means and about which the corresponding course of the belt is folded as the other frame portion and the corresponding wheel are swung about the axis of said hinge means, and means for locking said front and rear frame portions in folded position about said hinge means.

7. In endless track gear of the type having a longitudinal frame, front and rear wheels carried thereby and an endless belt encircling said wheels, the combination of hinge means dividing said frame transversely into aligned front and rear portions, and motive means for swinging said front frame portion upwardly and rearwardly about said hinge means to at least partially fold said front frame portion, the corresponding wheel and the corresponding belt section upon the rear frame portion and its appurtenant wheel and belt section.

8. In endless track gear of the type having a longitudinal frame, front and rear wheels carried thereby and an endless belt encircling said wheels, the combination of hinge means dividing said frame transversely into aligned front and rear portions, motive means for swinging said front frame portion upwardly and rearwardly about said hinge means to at least partially fold said front frame portion, the corresponding wheel and the corresponding belt section upon the rear frame portion and its appurtenant wheel and belt section, and a member mounted on said rear frame portion and extending across the upper surface of the belt at a point substantially opposite said hinge means about which said corresponding section of the belt is folded during the said swinging movement of said front frame portion.

9. In endless track gear of the type having a longitudinal frame, front and rear wheels carried thereby and an endless belt encircling said wheels, the combination of hinge means dividing said frame transversely into aligned front and rear portions, motive means for swinging said front frame portion upwardly and rearwardly about said hinge means to at least partially fold said front frame portion, the corresponding wheel and the corresponding belt section upon the rear frame portion and its appurtenant wheel and belt section, and reversing control means for causing said motive means to fold and unfold said gear.

10. In endless track gear of the type having a longitudinal frame, front and rear wheels carried thereby and an endless belt encircling said wheels, the combination of hinge means dividing said frame transversey into aligned front and rear portions, motive means for swinging said front frame portion upwardly and rearwardly about said hinge means to at least partially fold said front frame portion, the corresponding wheel and the corresponding belt section upon the rear frame portion and its appurtenant wheel and belt section, and means for locking said front and rear frame portions in folded position about said hinge means.

11. In endless track gear of the type having a longitudinal frame, front and rear wheels carried thereby and an endless belt encircling said wheels, the combination of hinge means dividing said frame transversely into aligned front and rear portions, said hinge means including a shaft journaled in said rear frame portion and rigidly secured to said front frame portion for movement therewith, a lever secured to said shaft, a hydraulic cylinder and piston combination connected at one end to the free end of said lever and pivoted at the other end on said rear frame portion, a source of fluid under pressure connected to said cylinder for actuating the piston therein, and a valve interposed in said connections for controlling the flow of fluid to said cylinder to thereby cause said piston to swing said front frame portion, the corresponding front wheel and the corresponding section of the belt to and from at least partially folded position over said rear frame portion.

12. In aircraft landing gear of the endless track type having a longitudinal frame, front and rear wheels carried thereby and an endless belt encircling said wheels, the combination of a transverse horizontal pivot connecting said frame to the aircraft, hinge means dividing said frame transversely into aligned front and rear portions, motive means for swinging said frame portions relatively to each other about said hinge means to at least partially fold one frame portion, the corresponding wheel and the corresponding section belt upon the other frame portion and its appurtenant wheel and belt section, and means connecting said frame to the aircraft for rotating said gear bodily about said horizontal pivot.

13. In aircraft landing gear of the endless track type having a longitudinal frame, front and rear wheels carried thereby and an endless belt encircling said wheels, the combination of a transverse horizontal pivot connecting said frame to the aircraft, hinge means dividing said frame transversely into aligned front and rear portions, motive means for swinging said frame portions relatively to each other about said hinge means to at least partially fold one frame portion, the corresponding wheel and the corresponding section belt upon the other frame portion and its appurtenant wheel and belt section, and means connecting said one frame portion to the aircraft for causing said motive means to simultaneously swing said gear bodily about said horizontal pivot.

14. In aircraft landing gear of the endless track type having a longitudinal frame, front and rear wheels carried thereby and an endless belt encircling said wheels, the combination of a strut extending downwardly from the aircraft, a substantially horizontal fore-and-aft pivot connecting said frame to said strut, hinge means dividing said frame transversely into aligned front and rear portions, and motive means for swinging said frame portions relatively to each other about said hinge means to at least partially fold one frame portion, the corresponding wheel and the corresponding section belt upon the other frame portion and its appurtenant wheel and belt section.

15. In aircraft landing gear of the endless track type having a longitudinal frame, front and rear wheels carried thereby and an endless belt encircling said wheels, the combination of a transverse horizontal pivot connecting said frame to the aircraft, hinge means dividing said frame transversely into aligned front and rear portions, motive means for swinging front said frame portions upwardly and rearwardly about said hinge means to at least partially fold said first frame portion, the corresponding wheel and the corresponding section belt upon the rear frame portion and its appurtenant wheel and belt section, and means connecting said front frame portion to the aircraft for causing said motive means to simultaneously rotate said gear bodily upwardly about said horizontal pivot.

16. In aircraft landing gear of the endless track type having a longitudinal frame, front and rear wheels carried thereby and an endless belt encircling said wheels, the combination of a transverse horizontal pivot connecting said frame to the aircraft, hinge means dividing said frame transversely into aligned front and rear portions, motive means for swinging said frame portions relatively to each other about said hinge means to at least partially fold one frame portion, the corresponding wheel and the corresponding section belt upon the other frame portion and its appurtenant wheel and belt section, means connecting said frame to the aircraft, and second motive means interposed between the aircraft and said last-named means for rotating said gear bodily about said horizontal pivot into a retracted position.

17. In aircraft landing gear of the endless track type having a longitudinal frame, front and rear wheels carried thereby and an endless belt encircling said wheels, the combination of a transverse horizontal pivot connecting said frame to the aircraft, hinge means dividing said frame transversely into aligned front and rear portions, motive means for swinging said front frame portion upwardly and rearwardly about said hinge means to at least partially fold said front frame portion, the corresponding wheel and the corresponding section belt upon the rear frame portion and its appurtenant wheel and belt section, means connecting said front frame portion to the aircraft for causing said motive means to simultaneously rotate said gear bodily upwardly about said horizontal pivot, and second motive means interposed between said gear and the aircraft for further rotating said gear upwardly into a substantially inverted position.

18. In aircraft landing gear of the endless track type having a longitudinal frame, front and rear wheels carried thereby and an endless belt encircling said wheels, the combination of a strut extending downwardly from the aircraft and pivoted thereto, a transverse horizontal pivot connecting said frame to the aircraft, hinge means dividing said frame transversely into aligned front and rear portions, motive means for swinging said front frame portion upwardly and rearwardly about said hinge means to at least partially fold said front frame portion, the corresponding wheel and the corresponding section belt upon the rear frame portion and its appurtenant wheel and belt section, means connecting said front frame portion to the aircraft for causing said motive means to simultaneously rotate said gear bodily upwardly about said horizontal pivot, and second motive means interposed between said strut and the aircraft for further rotating said gear upwardly into a substantially inverted position.

19. In aircraft landing gear of the endless track type having a longitudinal frame, front and rear wheels carried thereby and an endless belt encircling said wheels, the combination of a strut extending downwardly from the aircraft and comprising a cylinder member and a piston member, a pivot connecting the upper member to the aircraft, an inextensible tension member extending between said strut members and angularly offset at one end from the axis of said strut, means connecting the lower member of said strut to said frame, motive means on the aircraft, operative connections between said motive means and the upper member of said strut, and means for actuating said motive means to swing the strut and gear upwardly about said pivot to retracted position and simultaneously to change the angular relation between said tension member and strut to thereby exert a toggle effect and retract the lower strut member to thereby shorten the strut.

20. In aircraft landing gear of the endless track type having a longitudinal frame, front and rear wheels carried thereby and an endless belt encircling said wheels, the combination of a strut extending downwardly from the aircraft and comprising a cylinder member and a piston member, a pivot connecting the upper strut member to the aircraft, a tension member extending between the strut members and angularly offset at one end from the axis of said strut, a second pivot connecting said frame to the lower strut member, hinge means dividing said frame transversely into aligned front and rear portions, motive means for swinging said front frame portion upwardly and rearwardly about said hinge means to at least partially fold said front frame portion, the corresponding wheel and the corresponding belt section upon the rear frame portion and its appurtenant wheel and belt section, and second motive means interposed between said strut and the aircraft for swinging the strut and gear upwardly to retracted position and simultaneously changing the angular relation between said tension member and strut to exert a toggle effect and retract the lower strut member to thereby shorten the strut.

ALFRED A. GASSNER.

No references cited.